(No Model.)

E. SEITZ.
BEER COOLER.

No. 490,506. Patented Jan. 24, 1893.

WITNESSES:
C. M. Werlé
Heubert C. Reck.

INVENTOR
Edward Seitz
BY O. E. Duffy
ATTORNEY.

UNITED STATES PATENT OFFICE.

EDWARD SEITZ, OF PEORIA, ILLINOIS.

BEER-COOLER.

SPECIFICATION forming part of Letters Patent No. 490,506, dated January 24, 1893.

Application filed July 7, 1892. Serial No. 439,275. (No model.)

*To all whom it may concern:*

Be it known that I, EDWARD SEITZ, of Peoria, in the county of Peoria and State of Illinois, have invented certain new and useful Improvements in Beer-Coolers; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in beer coolers.

The object of the invention is to provide a beer cooler very cheap, simple and durable in construction and composed of a minimum number of parts, and wherein the beer can be quickly cooled, and which can be easily separated and cleansed, and wherein no accumulation of gas or dirt will take place.

A further object of the invention is to provide certain improvements in the construction of details and arrangements of parts whereby a highly efficient beer cooler is provided.

The invention consists in certain novel features of construction and in combinations of parts more fully described hereinafter and particularly pointed out in the claims.

Figure 1:
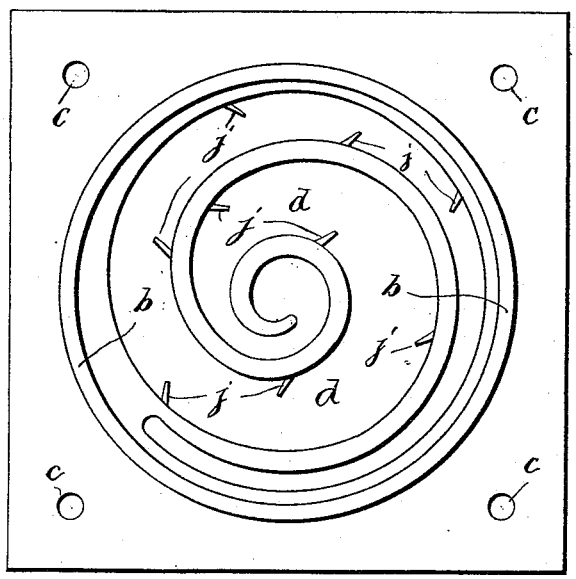
Figure 2:
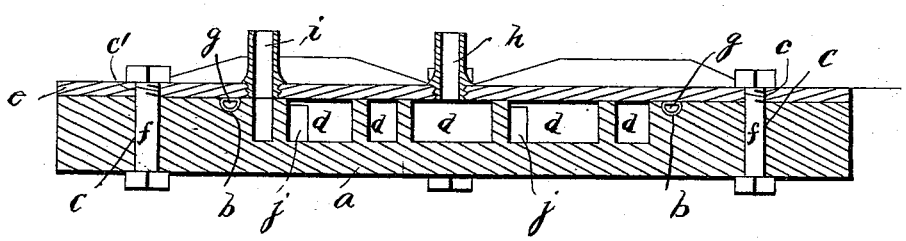

Referring to the accompanying drawings:—Figure 1 is a top plan view of the cooler with the top plate removed. Fig. 2 is a cross section.

In the drawings, the reference letter $a$, indicates the flat body of the cooler. This body has a circular or ring U shaped groove $b$, in one side and apertures $c$, outside of said groove to receive bolts.

$d$, indicates a shallow channel in the side of the body within the space inclosed by the circular groove $b$. This channel is preferably although not necessarily arranged spirally as shown.

$e$, indicates the top plates or cover fitted on the body and having transverse apertures $c'$ registering with apertures $c$ and receiving bolts $f$, by which the top plate is clamped tightly on the body to close the beer channel $d$. A rubber gasket $g$ is fitted in the groove $b$, and when the top plate is clamped tightly in position this gasket forms a tight joint around the space in which the beer channel is located. The groove $b$, is usually formed wider than the rubber gasket so that the gasket flattens out in the groove.

$h$, indicates the inlet through the top plate to the inner end of the beer cooling channel. From this inlet end the convolutions of the channel gradually increase outwardly. The width of the channel also gradually increases from the inlet end but decreases at the outer discharge end of the channel. The width of the channel at its discharge end is preferably not greater than the diameter of the beer discharge tube $i$ through the top plate. The object of this is to force the gas to flow out with the beer and to prevent gas accumulating at the beer discharge end of the channel because of the beer outlet being smaller than the beer discharge end of the channel. Also the inner end of the discharge pipe does not extend below the plane of the top surface of the beer channel to permit free outflow of gas. The inlet end of the beer cooling channel is also preferably not greater in width than the beer inlet pipe to prevent accumulation of gas. When the gas from the beer accumulates in a cooler or vessel it prevents the vessel, pipe or channel receiving its full capacity of beer $i$, $e$, prevents the beer completely filling the same.

$j$, indicates constructions in the beer channel, preferably, although not necessarily cast or otherwise formed integral with the body $a$ and projecting upwardly from the bottom of the beer channel to the top thereof. These inclined obstructions or deflectors are preferably arranged alternately on opposite sides of the channel as shown so as to deflect the beer alternately from one edge of the channel to the other, and thereby cause the beer to move over an extended area of cold surfaces.

Material advantages are attained by having the beer channel flat at the top and bottom and wide and shallow as the beer is thereby caused to spread out over the cold surfaces and becomes rapidly cooled to a low degree of temperature. By reason of the peculiar construction of this cooler extended cooling surfaces can be obtained and the channel can be made as shallow and wide as desired.

This cooler is of the utmost simplicity and durability and exceedingly cheap in construction, and the two sections of the cooler can each be cast integral. The cooler can be easily separated at any time and thoroughly and completely cleansed and in a short space of time. The shape of the channels facilitates the cleansing process.

Where deep channels are employed in beer coolers sediment and dirt collects in them, as there is always some dirt and sediment in the bottom of each keg and as all the beer in the cooler cannot be completely drawn off after each keg is emptied this dirt &c will flow into every glass when a fresh keg has been tapped and attached. My improved arrangement of shallow channels obviates this difficulty as all beer can be drawn off from the cooler and hence all the dirt &c will be discharged before the fresh keg is attached.

The top plate is usually cast with the ribs $k$ along the edges of its top surface extending from corner to corner. These ribs prevent this plate bending and also holds the ice on the plate.

Having thus fully described my invention what I claim as new and desire to secure by Letters Patent is:—

1. The beer cooler having the wide shallow beer channel with flat top and bottom walls, said channel having the inlet opening through its top wall with its diameter substantially equal to the width of the inlet end of the channel and the exit pipe at the opposite end of the channel opening through the top wall thereof so as to be flush with or above the under surface of said wall and with its diameter substantially the same as the width of the exit end of the channel for the purposes described.

2. The beer cooler formed of a body having the wide shallow beer channel in its upper face, the inclined deflectors in said channel integral with said body and projecting partially across the channel alternately from opposite sides thereof, and the top plate clamped on said body, substantially as described.

In testimony that I claim the foregoing as my own I affix my signature in presence of two witnesses.

EDWARD SEITZ.

Witnesses:
CHARLES R. UHLMANN,
H. J. FLORETH.